Nov. 3, 1936.  W. P. HOWLAND  2,059,238
ANIMAL TRAP
Filed Feb. 19, 1935
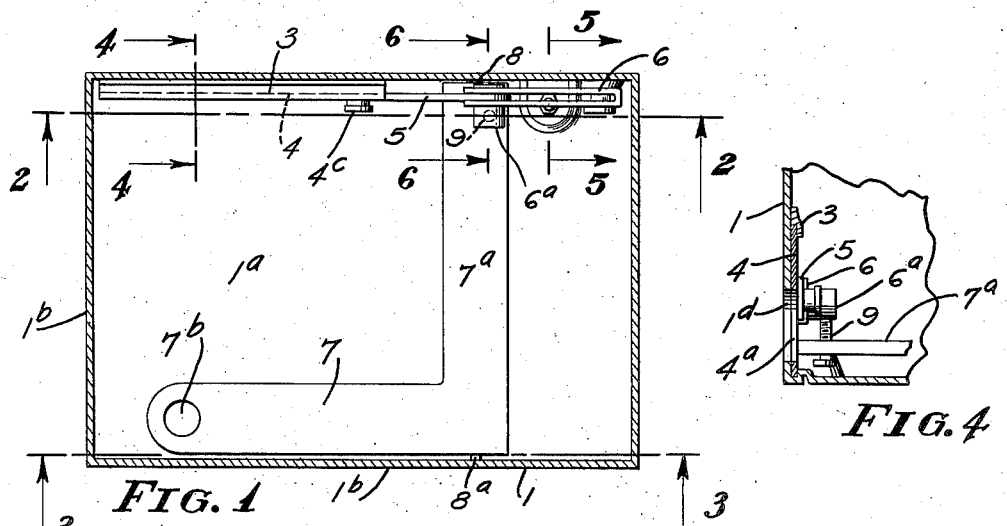
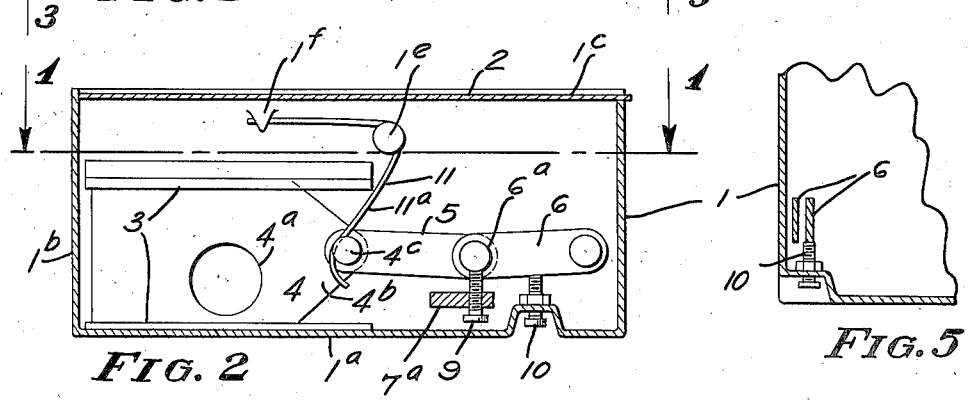
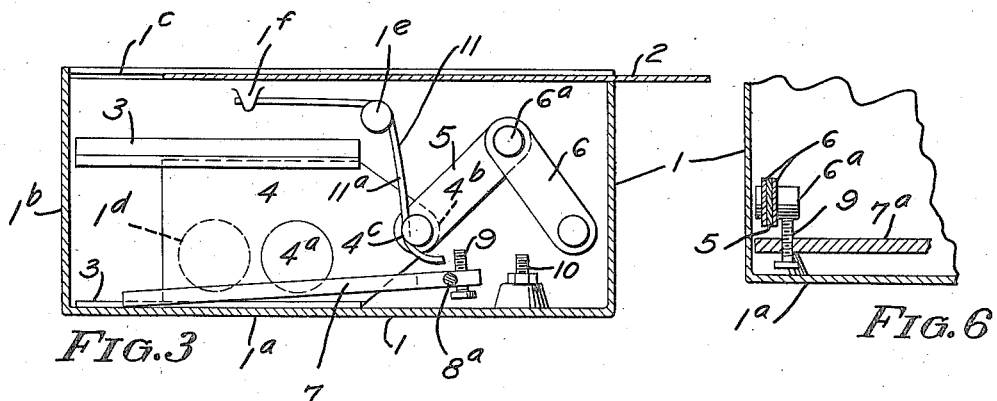
INVENTOR
Winthrop P. Howland
BY
A. B. Bowman
ATTORNEY Patented Nov. 3, 1936

2,059,238

UNITED STATES PATENT OFFICE 2,059,238

ANIMAL TRAP

Winthrop P. Howland, Pacific Beach, Calif.

Application February 19, 1935, Serial No. 7,205

4 Claims. (Cl. 43—61)

My invention relates to animal traps and the principal object of my invention is to provide an animal trap with improvements over my application for patent for Animal trap, Serial Number 687,303, filed August 29, 1933, which resulted in United States Letters Patent No. 1,982,870, issued December 4, 1934, which improvements are as follows:

First, to provide a trap for animals which is adapted to catch and hold the animal alive;

Second, to provide a trap of this class in which the trap is set by engaging a portion thereof remote from the operating element so that all danger of injuring one's fingers is eliminated and in which the bait is positioned remote from the animal entrance of the trap;

Third, to provide a trap of this class in which the animal gets wholly within the trap before it reaches the bait on the trigger for operating the trap;

Fourth, to provide an animal trap of this class for catching animals alive which may be readily and quickly set yet which requires only a delicate touch to release or spring the trap; and Fifth, to provide on the whole a novelly constructed animal trap for catching animals alive which is durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a fragmentary sectional view on line 1—1 of Fig. 2; Fig. 2 is a sectional view on line 2—2 of Fig. 1 showing the trap set and open ready to receive the animal; Fig. 3 is a sectional view on line 3—3 of Fig. 1 and showing the trap sprung, and Figs. 4, 5 and 6 are fragmentary sectional views on lines 4—4, 5—5 and 6—6, respectively, of Fig. 1.

Similar characters of reference refer to similar parts and portions throughout the several views of the drawing.

The casing 1, cover 2, guideways 3, gate 4, link 5, arm 6, trip lever 7, journal pins 8 and 8a, adjustment screws 9 and 10, and operating spring 11, constitute the principal parts and portions of my animal trap.

The casing 1 may be in the form of a rectangular box and has a flat bottom side 1a and vertically extending walls 1b. One of the vertically extending end walls is of less height and there are provided grooves 1c near the upper edge of the two side members in which is slidably mounted the cover 2 which is shown slightly open in Fig. 3 of the drawing, for getting at the interior of the trap for setting the same and for removing the animal therefrom. In one side wall 1b there is provided an aperture 1d of sufficient size to permit the animal to pass through. Above and below the aperture 1d there is provided a pair of guideways 3. A gate 4 is adapted to fit between the guideways and adjacent the inner side of the corresponding wall 1b. Said gate 4 is provided with an aperture 4a of the same size as the aperture 1d and is adapted to register therewith, as shown best in Figs. 2 and 4 of the drawing. The gate 4 moves longitudinally with one edge adjacent the bottom of the casing 1 and is provided at one end with an extended portion 4b. Said extended portion 4b is pivotally connected to one end of a link member 5, the other end of which is pivotally connected to a double arm member 6. The remaining extremity of the arm 6 is journalled from the side of the wall 1b of the casing at the end of said wall opposite from the aperture 1d. The extended portion 4b, link 5 and arm 6 are adapted to occupy a position in substantial alinement or with the joint between the members 5 and 6 slightly below their pivotal centers when the aperture 4a registers with the aperture 1d and to move so that the journal between the link 5 and arm 6 extends upwardly, as shown in Fig. 3 of the drawing, when the gate 4 is moved out of registry with the aperture 1d.

A trip lever 7 is provided which has an extended bar portion 7a which extends transversely across the trap near the lower side and is supported upon journals 8 and 8a at the opposite sides of the casing on the side members 1b. The point of support of the lever 7 is approximately opposite the juncture of the link 5 with the arm 6. At a point below the juncture between the link 5 and arm 6 when in the position shown in Fig. 2 of the drawing, the portion 7a is provided at its one end with an adjustment screw 9 which is adapted to engage an extended pivot member 6a at the juncture of the members 5 and 6 when the trap is in set position, as shown best in Fig. 2 of the drawing. Another adjustment screw 10 is supported from the casing below the arm 6 when in the position shown in Fig. 2. The trip lever 7 extends from the portion 7a along the side wall 1b opposite the wall in which the aperture 1d is positioned, as shown best in Fig. 1 of the drawing, and is positioned substantially in alinement with the aperture 1d at the opposite side of the casing in remote relation to the aperture. Here the lever 7 is provided with a suitable means 7b for holding a small quantity of bait. The journals 8 and 8a permit the member 7a to move in a slight arc about a horizontal axis, therefore, when the trap is set the portion 7b of the member 7 is in a raised position slightly above the bottom of the trap.

Supported from the side walls 1b of the casing by means of a suitable journal 1e is an operating spring 11 one arm of which is anchored at its extremity to the casing at 1f, the intermediate portion of which is wrapped about the journal 1e and the remaining arm, designated 11a, extends downwardly and engages an extended portion 4c extending at right angles from the portion 4b of the gate 4 and forming a journal for the link member 5 so that the spring tends to urge the gate to the right, as viewed in Figs. 2 and 3 of the drawing.

The operation of my animal trap is as follows: The trap is set by pressing downwardly on the member 6a when these members are in the position shown in Fig. 3 of the drawing. This pressure is against the spring 11 and moves the gate 4 to the position shown in Fig. 2 of the drawing. The adjustment screws 9 and 10 are so adjusted that when the extreme position shown in Fig. 2 is reached, the juncture between the link 5 and arm 6 is slightly below the connection of these members with the portion 4b and the casing. The set screw 10 in particular determines this position, while the set screw 9 determines the height to which the bait end of the lever 7 is raised when set. The animal upon detecting the bait at the portion 7b of the lever 7, passes through the aperture 1d in the side wall 1b and aperture 4a in the gate 4 which are in alinement, and crosses over in the casing 1 to the opposite side until the body is fully within the casing through the apertures 1d and 4a and in attempting to obtain the bait presses downwardly on the lever 7 causing the link 5 and arm 6 to be shifted upwardly passed the center, whereupon the spring 11 snaps the gate 4 to the position shown in Fig. 3 so that the apertures 1d and 4a are out of alinement and the animal is enclosed in the casing.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an animal trap, a casing having an aperture therein, a gate having an opening adapted to register with said aperture, link and lever means connected with said gate and casing arranged to occupy a slight over center position, an element for urging said gate out of registry with said aperture, said element being restrained when said link and lever means is over center, and a trip lever positioned with its free end at the opposite side of said casing from said aperture and opening and a portion engageable with said link and lever means to shift the same to a position responsive to said element.

2. In an animal trap, a pair of relatively movable members each having apertures adapted to register, link and lever means connecting said members, yieldable means for urging one of said members until said apertures are out of registry, said link and lever means having a position in which the yieldable means is restrained, a trip having a portion disposed at the opposite side of said casing from said apertures and a portion engageable with said link and lever means to shift the same out of its restraining position whereby said yieldable means may act.

3. In an animal trap, a casing having apertured therein, a gate having an opening adapted to register with said aperture, link and lever means connected with said gate and casing arranged to occupy a slight over center position, an element for urging said gate out of registry with said aperture, said element being restrained when said link and lever means is over center, and a trip lever having a bait portion positioned remotely to said aperture and opening, and a portion engageable with said link and lever means to shift the same to a position responsive to said element, and a device for determining the over center position of said link and lever means.

4. In an animal trap, a casing having an aperture therein, a gate having an opening adapted to register with said aperture, link and lever means connected with said gate and casing, a device for determining the over center position of said link and lever means, an element for urging said gate out of registry with said aperture, said element being restrained when said link and lever means is over center, and a trip lever including a bait end disposed in remote relation to said aperture and opening, and a member connected therewith extending transversely across said casing and pivotally mounted at its ends in the side walls of said casing and provided with adjustable means extending into engagement with said link and lever means to shift the same from its over center position to release said element.

WINTHROP P. HOWLAND.